US009280973B1

(12) United States Patent
Soyannwo et al.

(10) Patent No.: US 9,280,973 B1
(45) Date of Patent: Mar. 8, 2016

(54) NAVIGATING CONTENT UTILIZING SPEECH-BASED USER-SELECTABLE ELEMENTS

(75) Inventors: Olusanya T. Soyannwo, Cupertino, CA (US); Ramy S. Sadek, Mountainview, CA (US); Edward Dietz Crump, Santa Cruz, CA (US); Siddarth Raghunathan, Burlingame, CA (US); Renwei Yan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

(21) Appl. No.: 13/532,626

(22) Filed: Jun. 25, 2012

(51) Int. Cl.
*G10L 15/30* (2013.01)

(52) U.S. Cl.
CPC .................................... *G10L 15/30* (2013.01)

(58) Field of Classification Search
CPC ......... G10L 15/30; G10L 15/26; G06F 3/017; G06F 17/2705; G06F 3/016
USPC .................. 715/230, 233, 716, 728; 704/251
See application file for complete search history.

(56) References Cited

U.S. PATENT DOCUMENTS

| 7,240,006 | B1 * | 7/2007 | Brocious et al. ............. 704/270 |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 8,296,383 | B2 * | 10/2012 | Lindahl ......................... 709/206 |
| 2002/0077830 | A1 * | 6/2002 | Suomela et al. .............. 704/275 |
| 2003/0125945 | A1 * | 7/2003 | Doyle ............................ 704/246 |
| 2004/0002325 | A1 * | 1/2004 | Evans et al. ................. 455/414.1 |
| 2006/0288328 | A1 * | 12/2006 | Cross et al. ................... 717/114 |
| 2007/0282607 | A1 * | 12/2007 | Bond et al. .................... 704/260 |
| 2008/0034035 | A1 * | 2/2008 | Dodrill et al. ................. 709/203 |
| 2009/0083035 | A1 * | 3/2009 | Huang et al. .................. 704/260 |
| 2010/0070281 | A1 * | 3/2010 | Conkie et al. ................. 704/260 |
| 2011/0050592 | A1 * | 3/2011 | Kim et al. ...................... 345/173 |
| 2012/0223885 | A1 | 9/2012 | Perez |
| 2012/0284339 | A1 * | 11/2012 | Rodriguez .................... 709/204 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

\* cited by examiner

*Primary Examiner* — Michael N Opsasnick
(74) *Attorney, Agent, or Firm* — Lee & Hayes, PLLC

(57) ABSTRACT

In a content browsing environment, a system analyzes content to identify audio commands to be made available to users. The audio commands may be chosen so that they are easily differentiable from each other when using machine-based speech recognition techniques. When the content is displayed, the system monitors a user's speech to detect user utterances corresponding to the audio commands and performs content navigation in response to the user utterances.

29 Claims, 5 Drawing Sheets

NAVIGATING CONTENT UTILIZING SPEECH-BASED USER-SELECTABLE ELEMENTS

BACKGROUND

User interfaces have traditionally relied on input devices such as keyboards, which require physical manipulation by a user. Increasingly, however, it is desired to utilize more natural input mechanisms such as audio and speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for navigating content in response to user speech. When a user requests content, the content may be analyzed for keywords or phrases to be made available as audio commands. Such audio commands may be associated with user-selectable elements of the content, such as fields, links, and so forth.

A user's speech may be monitored during display or presentation of the content. When the user utters one of the available audio commands, the user-selectable element associated with the audio command is selected or activated.

When analyzing the content for audio commands words, phrases, and other sounds may be chosen based on their acoustic differentiability. In particular, audio commands may be selected based on the acoustic differentiability of the selected audio commands relative to each other. Selecting audio commands having unique or unambiguous acoustic characteristics may simplify the machine-based recognition of such audio commands.

Audio command words or phrases may be selected from the content itself, such as by analyzing user-selectable elements and/or by analyzing tags associated with user-selectable elements. For example, many user-selectable elements such as fields and links are associated with titles or descriptions, and the audio commands may be selected or derived from such titles or descriptions. Some user-selectable elements may also have other types of associated text from which audio commands may be formulated.

In some cases, user-selectable elements may comprise or may refer to pictures or other non-textual elements. Various techniques may be used in these situations to select corresponding audio commands. As an example, image recognition may be used to identify subjects of pictures, and such subjects may be used as the basis of audio commands. As another example, arbitrary keywords that can be unambiguously represented by graphical symbols may be used as audio commands.

When displaying or rendering content, the content may be altered to identify or indicate the available audio commands. For example, textual or graphical indications of audio commands may be overlaid on corresponding user-selectable elements such as pictures and other graphics. As another example, words of displayed content that are used as audio commands may be highlighted or otherwise emphasized to indicate their availability as audio commands.

Figure 1:
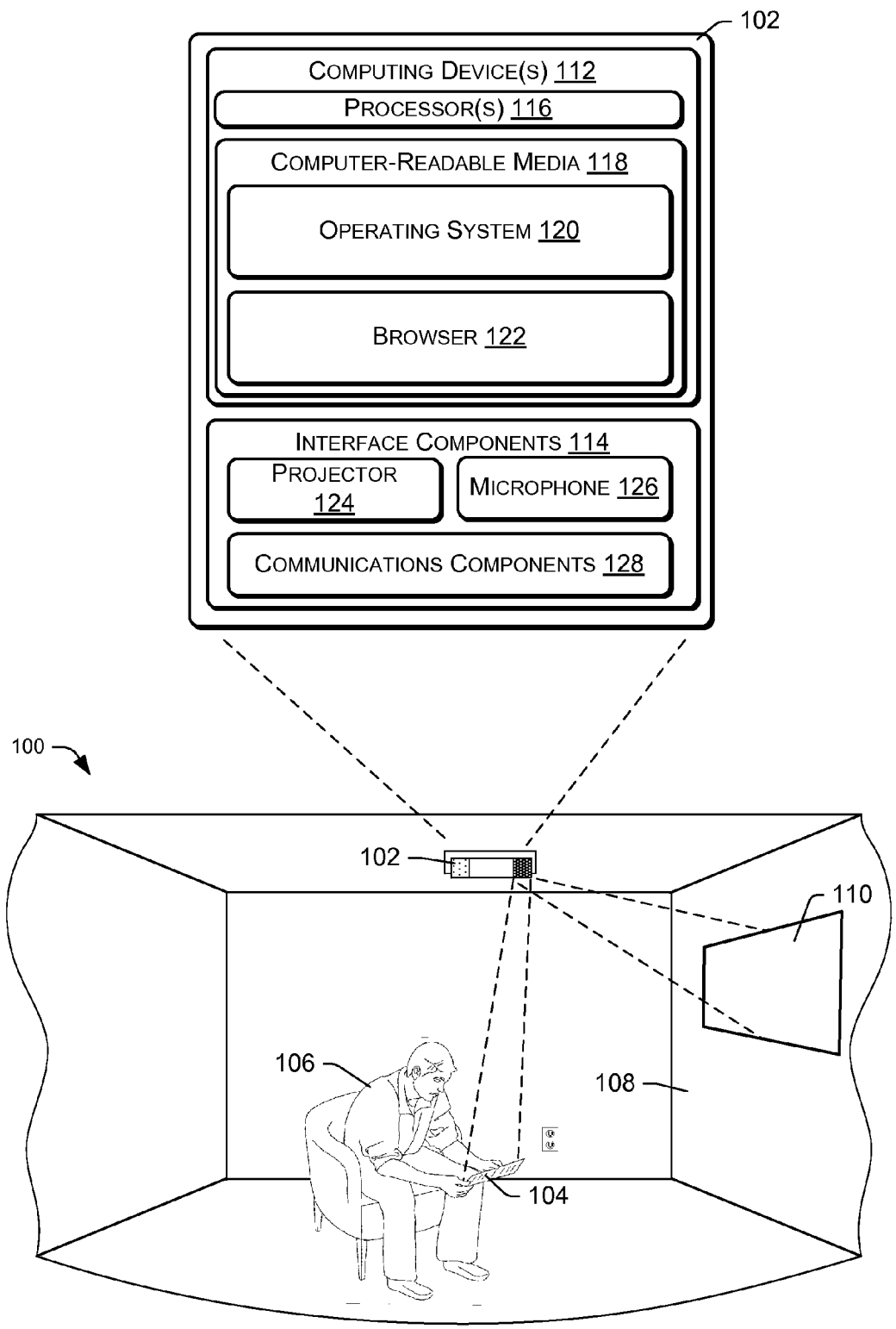
FIG. 1 illustrates an environment that includes a content presentation device for presenting content to a user and for navigating the content in response to audio input from the user.

FIG. 1 shows an example environment 100 in which the described techniques may be implemented. The environment 100 contains a content presentation device 102, which may be configured to display content within the environment 100. For example, the presentation device 102 may be configured to display content on a display medium 104, such as a blank sheet of paper held by a user 106. As another example, the content presentation device 102 may project content onto a portion of a wall 108 within the room, such as onto a display area 110 formed by the wall 108.

The content displayed by the presentation device 102 may include pictures, text, video, and so forth. In certain embodiments, the displayed content may comprise networked-based content such as content obtained from the Internet. The content may comprise linked or hyperlinked content, in which elements of the content are selectable by the user 106 for content navigation, selection, and control. The displayed content may also comprise other types of user-selectable elements, such as text input fields and item selection fields. In certain embodiments, user-selectable elements may comprise those elements of the content that are conventionally subject to selection through graphical means, such as by moving a visible pointer over the elements and/or performing a selection action such as "clicking" on or touching the elements.

In some embodiments, the content may be defined by a markup language such as HTML (hypertext markup language), which associates tags or other codes with visual elements to convey information about how the content is to be displayed and handled.

The presentation device 102 may comprise a computer or other device that is responsive to the user 106 to render and navigate content. In the illustrated example, the presentation device 102 has optical projection capabilities, and is configured to optically project the content onto an available surface within the environment 100. However, the presentation device 102 may alternatively comprise a device having an integral or associated display component, such as a conventional desktop computer, a laptop computer, a tablet computer, a media player, a smartphone, and so forth. The presentation device 102 may be stationary or portable.

The presentation device 102 may include one or more computing devices 112, as well as one or more interface components 114. The computing devices 112 and interface components 114 may be configured in conjunction with each other to interact with the user 106 within the environment 100.

The computing device 112 of the example presentation device 102 may include one or more processors 116 and computer-readable media 118. The processor(s) 116 may be configured to execute instructions, which may be stored in the computer-readable media 118 or in other computer-readable media accessible to the processor(s) 116. The processor(s) 116 may include digital signal processors (DSPs), which may be used to process audio signals.

The computer-readable media 118 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 112. The computer-readable media 118 may reside within a housing of the presentation device, on one or more storage devices accessible on a local network, on cloud storage accessible via a wide area network, or in any other accessible location.

The computer-readable media 118 may store various modules, such as instructions, datastores, and so forth that are configured to execute on the processor(s) 116. For instance, the computer-readable media 118 may store an operating system 120 and a browser component or module 122.

The operating system 120 may be configured to manage hardware and services within and coupled to the computing device 112 for the benefit of other modules. The browser 122 may be configured to display network-based and/or hyperlinked content in response to navigational input from a user. In the described embodiments, such navigational input may be in the form of speech or audio. Accordingly, the browser 122 may have functionality for handling audio commands in accordance with the techniques described herein. Such functionality may be an integral part of the browser 122, or may be provided as add-on or plug-in functionality.

The computer-readable media 118 may contain other modules, not shown, which may be configured to implement various different functionality of the presentation device 102.

The presentation device 102 may include various interface components 114, such as user interface components and other components that may be used to control, detect, and evaluate conditions and events within the environment 100. As examples most relevant to the discussion herein, the interface components 114 may include a projector 124 and a microphone 126. The projector 124 may be used to project content onto surfaces of the environment 100 for viewing by the user 106. The microphone 126 may be used to monitor user speech and utterances.

The interface components 114 may also include communications components 128. Such communications components 128 may include one or more network interfaces, including wired and wireless network interfaces. The communications components 128 may allow communications with other computers and various network entities, including network-based servers and services. The communications components 128 may allow communications with remote network entities such as Internet or other web-based servers and services.

The interface components 114 may in certain implementations include various other types of sensors and transducers, content generation devices, and so forth, which may be implemented within or apart from the presentation device 102.

Figure 2:
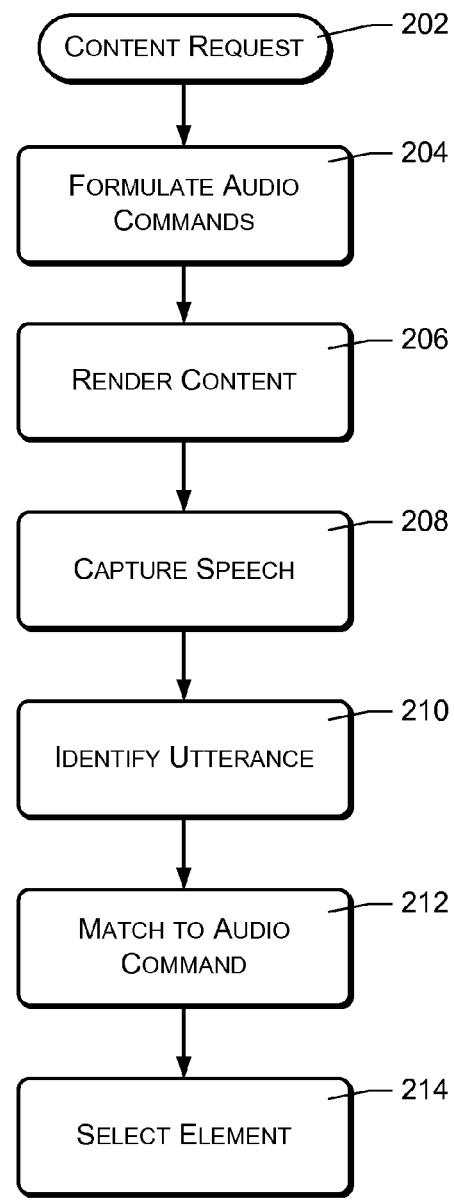
FIG. 2 is a flowchart illustrating an example method of navigating content in response to user utterances.

FIG. 2 illustrates techniques that may be implemented within the environment of FIG. 1 for presenting and navigating content in response to user speech or utterances. The described actions may be performed by the presentation device 102 or by the presentation device 102 in conjunction with one or more additional components such as network-based servers or other types of content providers. For purposes of discussion, the presentation device and any associated components or entities that cooperate in obtaining, presenting, and navigating the content will be referred to as the "system". The system may comprise any combination of entities and components that provide and render content for viewing by the user, such as servers, services, server proxies, clients, browsers, browser components, display components, and so forth. Responsibilities for specific actions may be allocated or assigned variously among different components of the system, depending on the implementation.

The actions of FIG. 2 are performed in response to a request 202 for designated content to be presented to a viewer or user. The content request 202 may comprise an HTTP (Hypertext Transfer Protocol) request such as is commonly used for requesting information over the Internet. The content request may specify a particular content item with reference to its network address or URL (Uniform Resource Locator).

The requested content may comprise text, pictures, video, and so forth. The content may include user-selectable elements such as links, text input fields, and other types of input fields. In certain embodiments, the content may comprise HTML content such as is commonly used in conjunction with the Internet and with Internet browsers. In such an environment, user-selectable elements may be defined or delineated by textual tags, which may indicate characteristics of the user-selectable elements. For example, such tags may indicate descriptions or other text associated with the user-selectable elements. In accordance with the techniques described below, tags such as this may also be added to content in order to associate audio commands with user-selectable elements.

An action 204 may comprise identifying or formulating audio commands corresponding to the content designated by the content request 202. More specifically, the action 204 may comprise identifying or formulating audio commands corresponding to respective user-selectable elements of the designated content. The audio commands may be formulated by analyzing or inspecting the content, and by selecting words or phrases from the content. For example, certain user-selectable elements of the content may be associated with text that may in turn be used as audio commands. Such text may be directly associated with a user-selectable element, such as may be the case where a user-selectable element specifies a textual description or heading. Text may also be indirectly associated with a user-selectable element, such as may be the case with text that is located visually near the user-selectable element. Audio commands may also be formulated from text that is referenced by a user-selectable element.

When selecting audio commands for a content page, the various available user-selectable elements of the content may be analyzed, and a unique audio command selected for each of the user-selectable elements. Individually, audio commands having relatively high acoustic differentiability may be selected. Collectively, the audio commands for a given portion of content may be selected to have unique and/or highly differentiable acoustic characteristics relative to each other, and such that the audio commands are differentiable by automated or machine-based speech recognition. This allows machine-based speech recognizers or algorithms to more reliably detect which of the audio commands is subsequently spoken by a user.

As an example, the action 204 of selecting the audio commands may avoid ambiguous audio commands having similar acoustic characteristics. Thus, the action 204 may avoid the concurrent use of the words "band" and "sand" as audio commands within the same content page, because it may be relatively more difficult to differentiate between those two words when performing subsequent speech recognition.

In some cases, certain user-selectable elements may have no associated text, or it may be impractical for other reasons to formulate audio commands from text associated with the user-selectable elements. For example, the content may include a picture with no associated textual identification. In the case of a picture, the action 204 may include performing image recognition to identify the subject of the picture or to otherwise identify text that may be used as an audio command for the picture.

Alternatively, audio commands may be arbitrarily assigned to certain user-selectable elements without regard to the content of the elements. For example, words corresponding to colors may be arbitrarily assigned to various elements, and the corresponding colors may be indicated visually in the content to indicate their association with certain elements. For example, a user-selectable element such as a picture may be bordered by a yellow line to indicate that the word "yellow" is an audio command corresponding to the picture.

The action 204 may include associating the formulated audio commands with their corresponding user-selectable elements. In some embodiments, this may be performed by modifying the content itself, such as by adding additional tags specifying audio commands. As an example, an "audio command" tag may be added to a user-selectable element within an HTML page. The audio command tag may contain a textual representation of the audio command, such as the text of a command word or phrase. Alternatively, the audio command tag may specify a phonetic representation of the audio command, or may specify an audio representation of the audio command such as a digital audio sample or file.

An action 206 may comprise rendering the designated content, such as by displaying or projecting the content on a display device or surface. The action 206 may be performed before, after, or in conjunction with the action 204 of formulating the audio commands. In certain implementations, the formulated audio commands may be indicated visually in the rendered content, in a manner that illustrates their association with user-selectable elements. An example of this will be described with reference to FIG. 3. Highlighting or otherwise indicating the audio commands in the content may be performed by a providing server or by a rendering client such as a browser.

An action 208 may comprise monitoring and/or capturing speech and/or utterances of the user. This may be performed by receiving audio from a microphone near the user. The action 208 may include capturing and/or receiving a user utterance, such as a sound, word, or phrase spoken by a user. The action 208 may include capturing the user utterance using a microphone or other sensor associated with the client presentation device 102, or by some other means. In some cases, the action 208 may comprise receiving a user utterance captured by another device or network entity. For example, the action 208 may be performed by a server that receives the user utterance from the presentation device 102.

The captured speech or utterance may comprise an audio segment or sample, and may be represented as a series or sequence of digital values, which may in turn be incorporated in a digital file or other data object. Alternatively, the captured speech or utterance may be represented by a continuous audio stream.

An action 210 may comprise identifying a user utterance, based on the speech or audio captured in the action 208. In some implementations, the system may detect relevant utterances by comparing any words or phrases spoken by the user with the audio commands formulated in the action 204. In other cases, the system may be configured to detect utterances following a predefined word or keyword that has been reserved for that purpose. For example, the word "system" may be reserved as a signal that the following word or phrase is intended to be an audio command, and that any immediately following words should be identified as relevant user utterances.

In response to the action 210 of identifying a user utterance, an action 212 is performed of identifying one of the audio commands that corresponds to or matches the user utterance. Thus, the action 212 may comprise matching the user utterance to one of the audio commands formulated in the action 204. Such matching may be performed by comparing audio samples, or by performing speech-to-text conversion on the identified user utterance and then comparing the resulting text with the previously formulated audio commands.

An action 214 may comprise selecting the user-selectable element corresponding to the matched audio command. This may involve navigating to new content that is specified by a new content request 202, whereupon the described actions of FIG. 2 are repeated with respect to the newly specified content. The selection 214 may alternatively comprise changing the focus of an on-screen cursor or indicator, such as by moving an active input area to a particular data input field. In some situations, selecting a user-selectable element may initiate other types of actions, including functions and activities.

Figure 3:
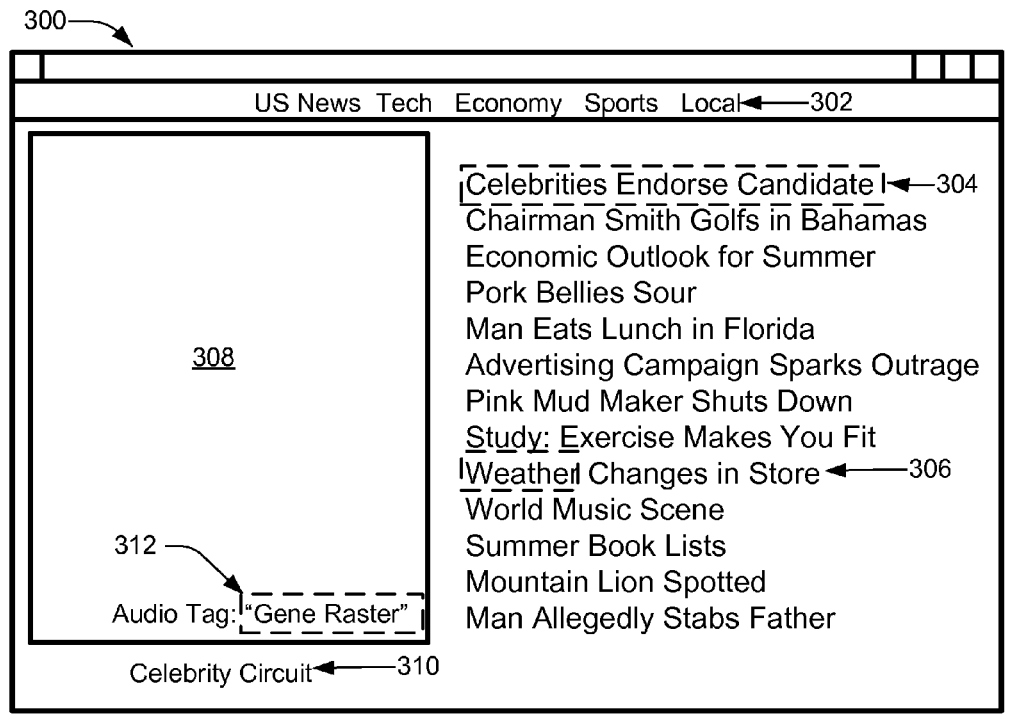
FIG. 3 is an example of a displayed user interface in which audio commands have been emphasized.

FIG. 3 illustrates an example of content 300 that may be displayed in the action 206 of FIG. 2. The content 300 may comprise various types of media elements, including pictures, video, text, graphics, and so forth. Many of the media elements may be selectable by a user. In other environments, such elements may be selectable by physically touching them or by "clicking" on them. In the described environment, however, a user may select a displayed element by making an appropriate utterance, such as speaking a word or phrase that has been associated with the element.

As an example, the content 300 of FIG. 3 contains a set of user-selectable elements or links 302, corresponding to the words or phrases "US News", "Tech", "Economy", "Sports", and "Local". A user may speak one of these words or phrases, and the corresponding element or link 302 will be selected and acted upon. For example, speaking the word "Economy" will select the corresponding element, and will navigate to new content related to economic news. Specifically, speaking the word "Economy" will navigate to new content that is specified by the user-selectable element with which the audio command "Economy" has been associated.

Elements that may be activated by user utterance are highlighted in some manner to indicate the audio command words corresponding to the elements. The content of FIG. 3 contains, as an example, a user-selectable element 304 titled "Celebrities Endorse Candidate". In this example, the entire phrase is highlighted or emphasized to indicate that a user should speak the entire phrase to activate that element.

As another example, the content of FIG. 3 contains a user-selectable element 306 titled "Weather Changes in Store". In this case, only the word "weather" is emphasized, indicating that the user may speak the word "weather" to activate the element 306 and navigate to the corresponding content.

As yet another example, the content of FIG. 3 includes an image or picture 308, which may or may not be accompanied by a title or description 310. In this example, although the picture title 310 reads "Celebrity Circuit," the picture itself is of a celebrity hypothetically named "Gene Raster". Prior to rendering the content 300, the system may perform image recognition on the picture 308 to determine the subject or topic of the picture, and may formulate an audio command based on the determined subject or topic of the picture. Alternatively, it may be possible with some images to identify text within the images, which may be used to form audio commands. An indication of any formulated audio command may be added to the content 300, such as by adding a textual label 312 that indicates the audio command. A user may speak the indicated audio command in order to activate the picture 308 or other media item, such as to open a larger view of the picture 308.

Similarly, audio content may be analyzed using automated speech recognition to identify words spoken in the audio, and such words may be the basis of audio commands.

As a further example, a picture or other non-textual content may have associated metadata that can be analyzed for the presence of relevant words, which may be used as audio commands. For example, pictures may be associated with exchangeable image file format (EXIF) information or data, which may include words or text that may be useful in identifying or formulating audio commands.

In general, any non-text content may be analyzed to detect words that are indicated by the content or that are related to the content, and those words may be used as the basis of audio commands.

Alternatively, a user-selectable element may be associated with an arbitrary audio command, such as an arbitrarily assigned color or number. For example, the word "yellow" may be assigned as an audio command corresponding to the picture 308, and may be indicated by a corresponding yellow border or icon displayed in conjunction with the picture. For example, the pictured may be bordered by a yellow line, or a yellow icon may be displayed over the picture.

Figure 4:
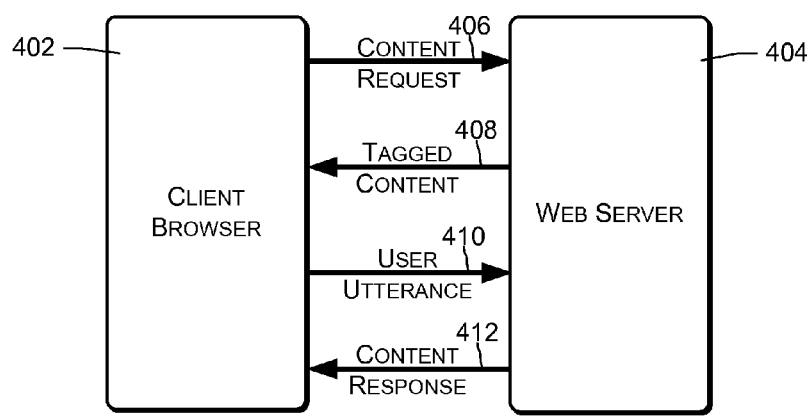
FIGS. 4-6 are block diagrams illustrating example server/client architectures in which the described techniques are implemented.
Figure 5:
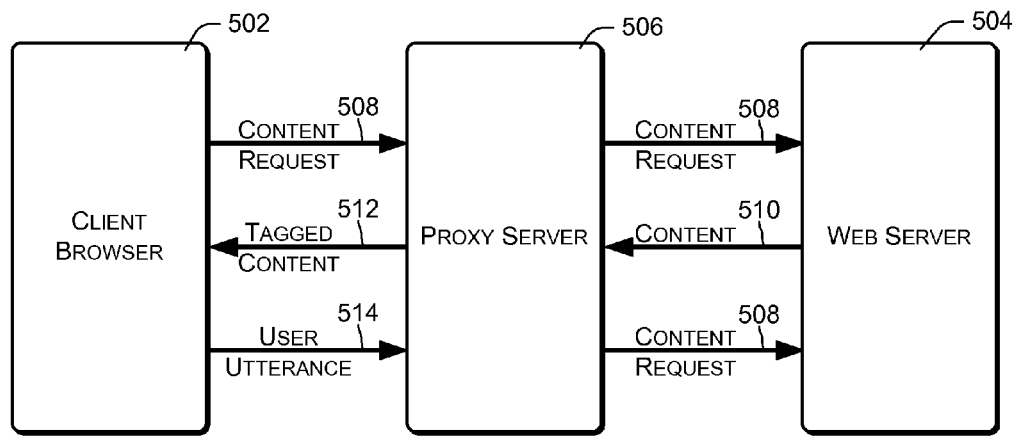
Figure 6:
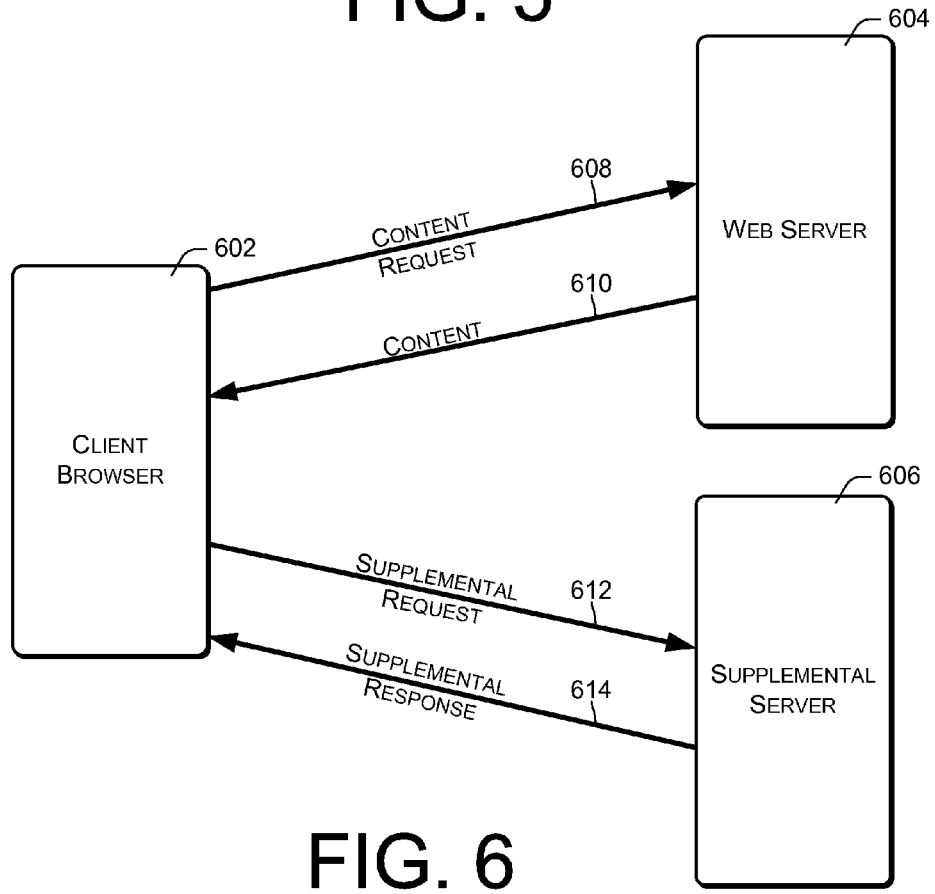

FIGS. 4-6 illustrate various client and server configurations that may be used to implement the techniques described above. Note that in a basic configuration, the described functionality may be performed by a self-contained computer, using locally available content. Similarly, a client such as an Internet browser may be configured to perform the described functionality with respect to Internet-based content. In other configurations, functionality may be distributed between a client or browser and one or more servers in various ways, examples of which are shown by FIGS. 4-6. Communications between clients and web servers may be through one or more networks, including public networks, private networks, and so forth, including the Internet.

FIG. 4 illustrates an implementation in which a client browser 402 requests and obtains content from a web server 404. The client browser 402 and the web server 404 are configured to formulate and highlight audio commands, to monitor user utterances, and to respond to user utterances.

The client browser 402 initially communicates a content request 406 to the web server 404 designating content requested by a user. The web server 404 receives the content request 406 and responds by analyzing the requested content to identify or formulate audio commands, by tagging the content with the audio commands, and by providing the tagged content 408 to the client browser 402.

The client browser 402 displays the tagged content and concurrently monitors user speech or utterances. Upon detecting or capturing a user utterance 410, the user utterance 410 is provided to the web server 404 and the web server 404 responds by matching the user utterance to one of the audio commands of the tagged content 408. The web server 404 then creates a content response 412 and transmits the content response 412 to the client browser 402. The content response 412 may comprise tagged content such as the tagged content 408, which may again be navigated in response to further user utterances.

The client browser may display the tagged content 408 without alteration, or may alter the content so that the available audio commands are shown and/or emphasized. In some cases, the web server 404 may alter the content before returning it to the client browser 402, so that the formulated audio commands are appropriately indicated or highlighted for the viewing user.

The user utterance 410 may be communicated from the client browser 402 to the web server 404 as a continuous audio stream, as a compressed audio segment or data object, or as text that has been derived from audio-to-text or speech-to-audio conversion.

FIG. 5 illustrates a configuration in which a client browser 502 receives and displays content from a web server 504 through a proxy server 506 that provides functionality related to audio tagging and browsing. The client browser 502 makes an initial content request 508, which is routed first to the proxy server 506. The proxy server 506 forwards the content request 508 to the appropriate web server 504—which may be any conventional web server or data source as specified by the content request 508. The web server 504 responds by providing the requested content 510 to the proxy server.

In response to receiving the content 510, the proxy server analyzes the content 510 to identify or formulate audio commands, and associates the audio commands with the content 510. The audio commands may be incorporated in the content 510 as HTML tags, resulting in tagged HTML content 512 that is returned to the client browser 502.

The client browser 502 receives the tagged content 512 and displays the tagged content 512 for viewing by the user. The client browser 502 may also be configured to display or highlight audio commands as shown by FIG. 3. In some cases, the proxy server 506 may modify the content to indicate or highlight the audio commands.

While displaying the content, the client browser may also monitor speech or audio produced by the user, and may provide user utterances 514 to the proxy server 506. The user utterances may be converted to text either by the client browser 502 or by the proxy server 506.

In response to receiving the user utterance 514, the proxy server issues another content request 508 to the web server 504, based on the user-selectable element of the content that corresponds to the user utterance 514. The described process then repeats itself, by tagging and returning new content 512 to the client browser 502.

FIG. 6 illustrates a configuration in which a client browser 602 receives and displays content from a web server 604 and which also uses a supplemental server 606 for performing some of the functionality described herein. The web server 604 may comprise any conventional web site, server, or data source. The supplemental server 606 may be a server that is configured to analyze content to formulate audio commands, to match user utterances to such audio commands, and to provide appropriate responses to user utterances.

In the example of FIG. 6, the client browser initially sends a content request 608 to the web server 604. The content request 608 may be a conventional HTTP request, and the web server 604 may respond by returning conventional HTML content 610 to the client browser 602.

In response to receiving the content 610, the client browser may display the content in a conventional manner, and may also monitor for user utterances. Upon detecting a user utterance, the client browser 602 may send a supplemental request 612 to the supplemental server 606. The supplemental request 612 may indicate or include the content 610 currently being displayed by the client browser 602, as well as audio corresponding to the user utterance. The supplemental server may respond by analyzing the content 610 and formulating audio commands as described above. In addition, the supplemental server may convert the received audio to text, and may compare the text to the formulated audio commands to identify a user-selectable element of the content 610 that corresponds to the user utterance. The supplemental server 606 may then provide a supplemental response 614, specifying one or more actions that the client browser 602 should perform in response to the user utterance. For example, the supplemental response may indicate an HTTP request that the client browser should execute in response to the user utterance. The HTML request may correspond to a data link or URL indicated by the user-selectable element that is selected in response to the user utterance.

As noted above, the supplemental request 612 may indicate or contain the content that is being displayed by the client browser 602. The indicated content may comprise the entirety of the content 610, or may comprise only the portion of the content 610 that is currently visible to the user. Furthermore, the content indicated by supplemental request 612 may in some cases be limited to data relating to user selectable elements. For example, the content indicated by the supplemental request 612 may comprise only the tags of user-selectable elements and any data or text associated with such user-selectable elements.

Figure 7:
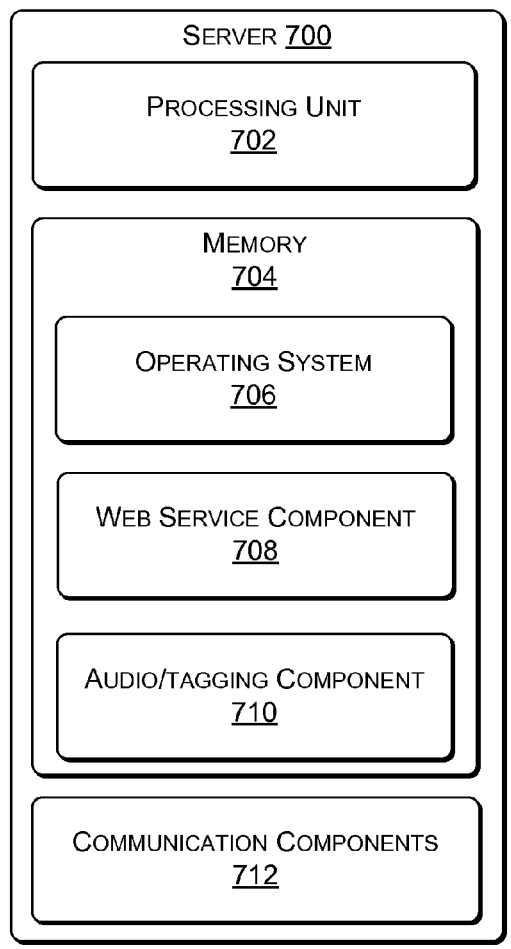
FIG. 7 is a block diagram of an example server that may be used in conjunction with the techniques described herein.

FIG. 7 illustrates relevant components of a server 700 that may be used in the architectures described with reference to FIGS. 4-6. For example, the web server 404, the web server 504, the proxy server 506, the web server 604, and the supplemental server 606 may each be implemented by a server such as shown by FIG. 7. Generally, each of the servers illustrated and discussed herein may be implemented by one or more servers or server instances, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, the example server 700 might comprise a processing unit 702 composed one of one or more processors, and memory 704. The memory 704 may comprise computer storage media and may include volatile and non-volatile memory. Thus, the memory 704 may include, but is not limited to, RAM, ROM, EEPROM, flash memory, or other memory technology, or any other medium which can be used to store data.

The memory 704 may be used to store any number of functional components that are executable on the processing unit 702, as well as content that is supplied to consuming devices such as the presentation device 102. As examples, the memory 704 may store an operating system 706 and a web services component 708 for communicating with client devices.

In some situations, the memory 704 may also contain an audio and/or tagging component 710, configured to formulate audio commands, to tag content, to recognize audio utterances, and so forth as described above.

The server 700 may also include communications components 712 for network communications with other network entities, including clients and other servers.

The server 700 may of course include many other logical, programmatic, and physical components, of which those shown in FIG. 7 are merely examples that are related to the discussion herein.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer-executable instructions that, when executed by one or more processors, cause the one or more processors to perform acts comprising:
   receiving a designation of content having user-selectable elements;
   analyzing the content to identify an audio command corresponding to one or more user-selectable elements of the user-selectable elements, the audio command being identified based at least in part on an acoustic differentiation between the audio command and a different audio command meeting or exceeding a threshold;
   receiving a signal associated with an utterance of a user, the signal generated by a microphone associated with a device;
   analyzing the signal associated with the utterance to determine the audio command; and
   responding to the utterance in accordance with a user-selectable element of the one or more user-selectable elements corresponding to the audio command, the responding including
      causing information associated with the audio command to be visually output via a projector associated with the device.

2. The one or more non-transitory computer-readable media of claim 1, wherein analyzing the content to identify the audio command comprises identifying words of the content based at least in part on the acoustic differentiation between the audio command and the different audio command by a machine-implemented speech recognizer.

3. The one or more non-transitory computer-readable media of claim 1, wherein analyzing the content to identify the audio command comprises selecting text from the content.

4. The one or more non-transitory computer-readable media of claim 1, wherein analyzing the content to identify the audio command comprises selecting text associated with the one or more user-selectable elements.

5. The one or more non-transitory computer-readable media of claim 1, wherein at least one user-selectable element of the user-selectable elements is associated with an image, and wherein analyzing the content to identify the audio command comprises performing image recognition to identify one or more words that correspond to the image.

6. The one or more non-transitory computer-readable media of claim 1, wherein at least one user-selectable element of the user-selectable elements is associated with audio, and wherein analyzing the content to identify the audio command comprises performing speech recognition to identify one or more words that correspond to the audio.

7. The one or more non-transitory computer-readable media of claim 1, the acts further comprising displaying textual indications of the audio command in conjunction with the content.

8. The one or more non-transitory computer-readable media of claim 1, wherein an individual user-selectable element of the user-selectable elements is associated with non-textual media, and wherein analyzing the content to identify the audio command comprises recognizing one or more words indicated by the non-textual media.

9. A method, comprising:
receiving, by one or more computing devices, a request designating content, wherein the content has a user-selectable element;
determining, by at least one computing device of the one or more computing devices, an audio command corresponding to the user-selectable element, the audio command being determined based at least in part on an acoustic differentiation between the audio command and a different audio command meeting or exceeding a threshold;
associating, by at least one computing device of the one or more computing devices, the audio command with the user-selectable element; and
causing information associated with audio command to be visually output by a projector associated with the second device.

10. The method of claim 9, further comprising:
identifying the audio command in response to a user utterance; and
responding to the user utterance in accordance with the user-selectable element that corresponds to the audio command.

11. The method of claim 9, wherein determining the audio command is performed based at least in part on the acoustic differentiation between the audio command and the different audio command by a machine-implemented speech recognizer.

12. The method of claim 9, wherein determining the audio command comprises selecting text from the content.

13. The method of claim 9, wherein determining the audio command comprises selecting text from the user-selectable element.

14. The method of claim 9, wherein the user-selectable element is associated with audio, and wherein determining the audio command comprises performing speech recognition to identify one or more words that correspond to the audio.

15. The method of claim 9, wherein the user-selectable element is associated with an image, and wherein determining the audio command comprises performing image recognition to identify one or more words that correspond to the image.

16. The method of claim 9, wherein the user-selectable element is associated with non-textual media, and wherein determining the audio command comprises recognizing one or more words indicated by the non-textual media.

17. The method of claim 9, further comprising causing display of textual indications of the audio commands in conjunction with the content.

18. A system comprising:
one or more processors;
one or more computer-readable media storing computer-executable instructions that, when executed by the one or more processors, cause the one or more processors to perform acts comprising:
receiving a request that specifies a user utterance with regard to content having user-selectable elements;
analyzing the content to identify an audio command corresponding to one or more user-selectable elements of the user-selectable elements, the audio command being identified based at least in part on an acoustic differentiation between the audio command and a different audio command meeting or exceeding a threshold;
selecting the audio command based at least in part on the user utterance; and
responding to the request in accordance with a user-selectable element of the one or more user-selectable elements corresponding to the audio command, the responding including
causing information associated with the audio command to be visually output via a projector associated with a device.

19. The system of claim 18, wherein the request identifies at least a portion of the content.

20. The system of claim 18, wherein analyzing the content to identify the audio command comprises selecting words of the content based at least in part on differentiability of the words by a machine-implemented speech recognizer.

21. The system of claim 18, wherein analyzing the content to identify the audio command comprises selecting text from the content.

22. The system of claim 18, wherein analyzing the content to identify the audio command comprises selecting text associated with the one or more user-selectable elements of the user-selectable elements.

23. The system of claim 18, wherein at least one user-selectable element of the user-selectable elements is associated with audio, and wherein analyzing the content to identify the audio command comprises performing speech recognition to identify one or more words that correspond to the audio.

24. The system of claim 18, wherein at least one user-selectable element of the user-selectable elements is associated with an image, and wherein analyzing the content to identify the audio command comprises performing image recognition to identify one or more words that correspond to the image.

25. The system of claim 18, wherein at least user-selectable element of the one or more user-selectable elements is associated with non-textual media, and wherein analyzing the content to identify the audio command comprises recognizing one or more words indicated by the non-textual media.

26. The system of claim 18, wherein the acts further comprise causing display of textual indications of the audio command in conjunction with the content.

27. The one or more non-transitory computer-readable media of claim 1, wherein analyzing the content to identify the audio command comprises excluding audio commands having a different acoustic differentiation that is less than the threshold.

28. The one or more non-transitory computer-readable media of claim 1, wherein the acts further comprise indicating an availability of the audio command by causing at least one of a textual indication or a graphical indication to be overlaid on the user-selectable element.

29. The one or more non-transitory computer-readable media of claim 1, wherein the acts further comprise indicating an availability of the audio command by causing the information to be emphasized via a display associated with the device.

* * * * *